United States Patent [19]

Townsend

[11] Patent Number: 4,996,742
[45] Date of Patent: Mar. 5, 1991

[54] SAFETY METHOD AND MEANS FOR STOPPING AND STARTING MEAT SKINNING MACHINES

[75] Inventor: Ray T. Townsend, Des Moines, Iowa
[73] Assignee: Townsend Engineering Company, Des Moines, Iowa
[21] Appl. No.: 447,156
[22] Filed: Dec. 7, 1989
[51] Int. Cl.⁵ .......................... A22B 5/16; A22C 17/12
[52] U.S. Cl. ...................................... 452/125; 452/71
[58] Field of Search ............................... 17/21, 50, 52; 192/130 R, 130; 2/2, 16, 20, 154

[56] References Cited

FOREIGN PATENT DOCUMENTS 3501021 7/1985 Fed. Rep. of Germany .......... 17/21

Primary Examiner—Willis Little
Attorney, Agent, or Firm—Zarley, McKee, Thomte, Voorhees & Sease

[57] ABSTRACT

This invention utilizes a conventional meat skinning machine having a frame, an elongated skinning blade, a rotatable gripping roll closely positioned adjacent the blade, an electrical motor operatively connected to the gripping roll and to a source of electrical power, and a danger zone defined by the area approximate to the gripping roll closely adjacent the blade. The motor is a braking motor which has a normally inoperative braking means adapted to stop the motor substantially instantaneously when becoming operative. A safety circuit is electrically connected to the braking motor, the blade and the gripping roll. The safety circuit is normally open and is adapted to be closed when the blade and gripping roll are electrically connected by any electroconducting means, such as an operator's glove made of electroconducting material, that simultaneously comes into electrical contact with the blade and the gripping roll. The closing of the safety circuit causes the braking means to be actuated substantially instantaneously to stop the braking motor and to stop substantially instantaneously any further rotation of the gripping roll.

13 Claims, 2 Drawing Sheets

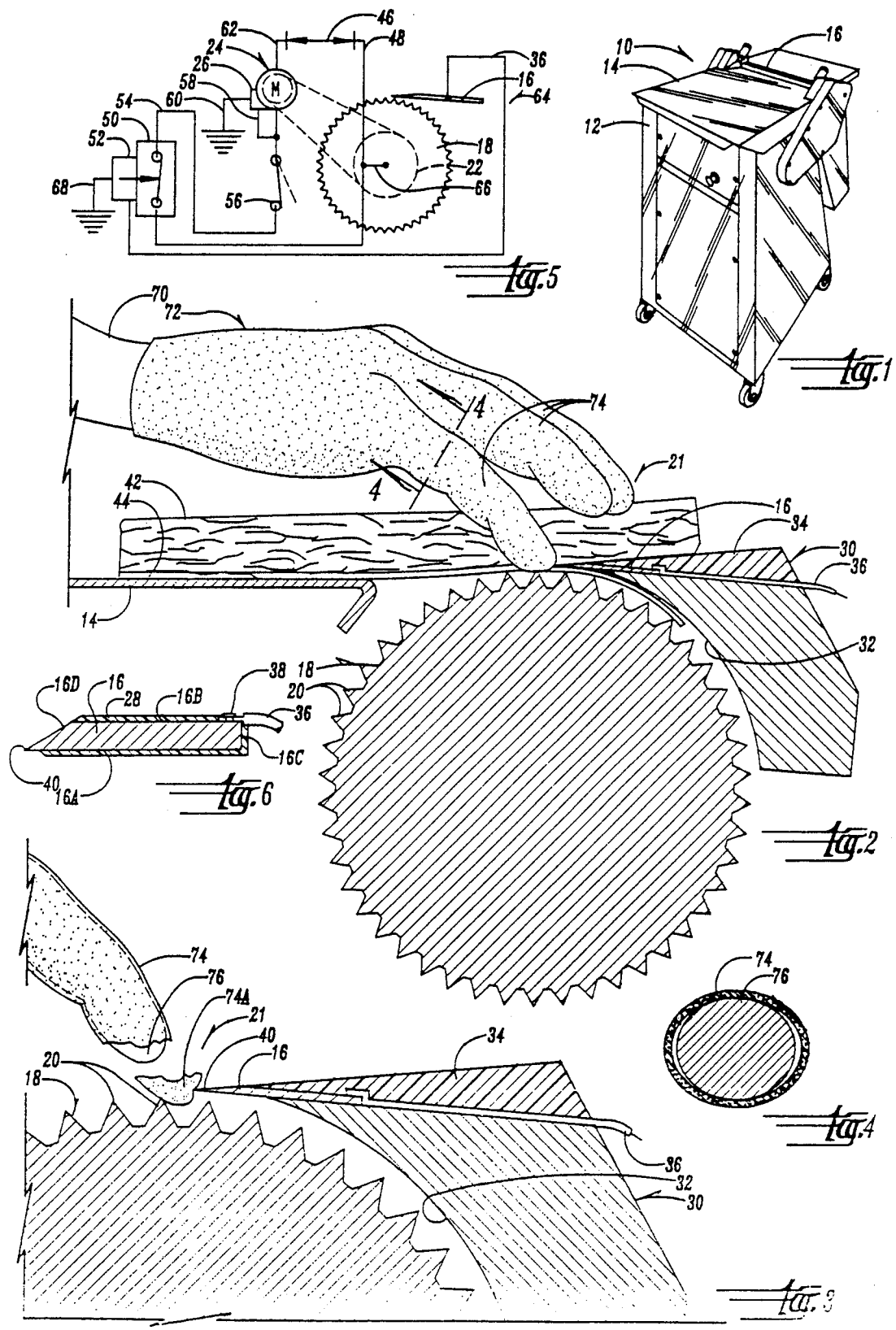

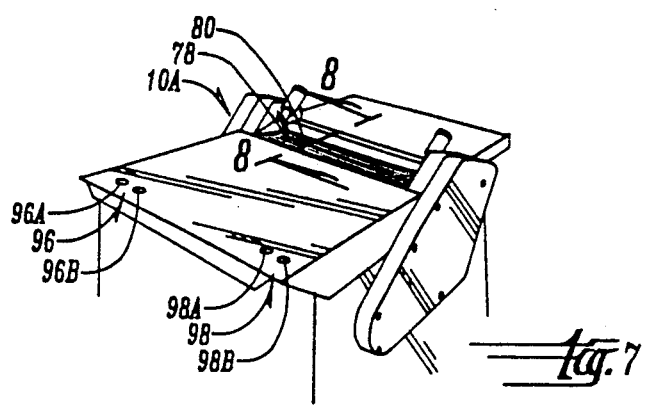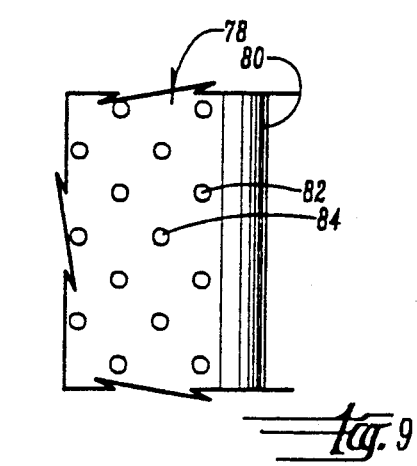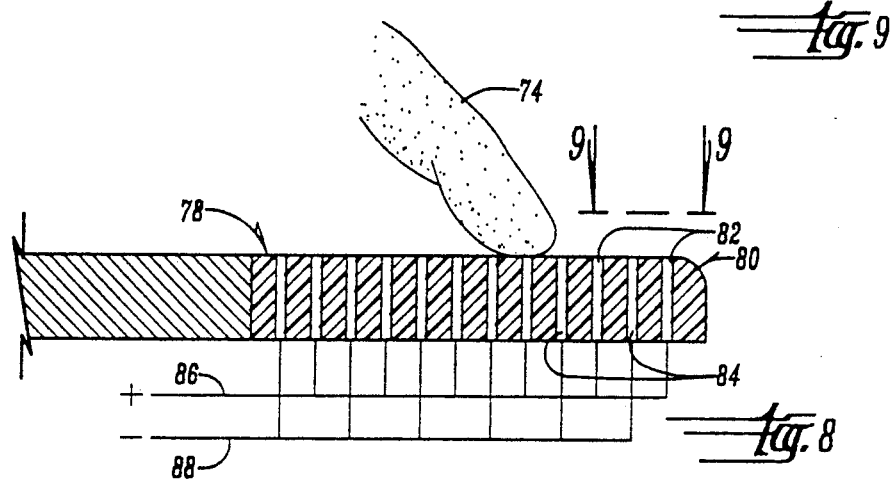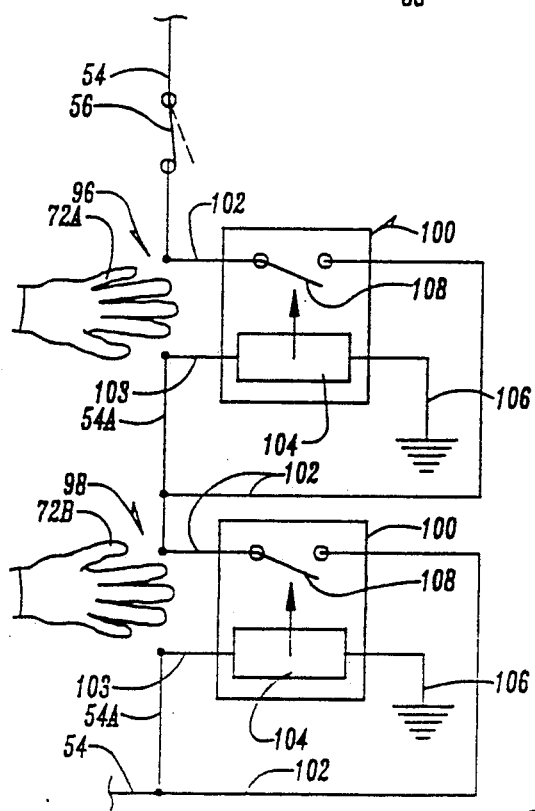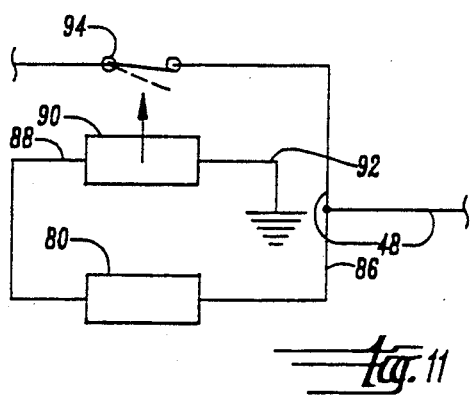

SAFETY METHOD AND MEANS FOR STOPPING AND STARTING MEAT SKINNING MACHINES

BACKGROUND OF THE INVENTION

Meat skinning machines adapted to remove skin or membrane from meat, poultry or fish products have long been in existence. These machines include an elongated sharp skinning blade which is positioned adjacent a gripping roll having a plurality of teeth thereon for pulling the meat product towards the cutting edge of the blade.

Occasionally, the operators of these machines will inadvertently allow their hands or fingers to come in contact with the gripping roll whereby their hands or fingers will be drawn into contact with the skinning blade.

While safety switches and the like have been developed to permit the operator to stop the machine, and hence stop the rotation of the gripping roll, these devices do not always function automatically, and they do not function quick enough to prevent injury to the operator.

Therefore, it is a principal object of this invention to provide a safety method and means for stopping meat skinning machines which will automatically and substantially instantaneously stop the machine when the operator's hands or fingers are in contact with the danger zone that surrounds the gripping roll and the adjacent cutting edge of the skinning blade A further object of this invention is to provide a safety method and means for stopping meat skinning machines which employs the use of an operator's glove made of a material capable of conducting electrical current and which is of low tensile strength to permit portions thereof to be torn away from the glove body when those portions become entangled in the teeth of the gripping roll.

A further object of this invention is to provide a safety method and means for stopping meat skinning machines which employs the use of an operator's glove made of a material capable of conducting electrical current which will make electrical contact with terminals on a danger area on the machines whereby electrical power will immediately be withdrawn from the machine if the glove comes into contact with said safety area.

A further object of this invention is to provide a safety method and means for stopping meat skinning machines which employs the use of an operator's glove made of a material capable of conducting electrical current which will serve to induce the machine operator to wear such gloves on both hands by providing pairs of spaced power switch terminals on the machine that can be closed only by simultaneous but separate contact between the terminals of each pair of terminals with the respective electroconducting gloves.

These and other objects will be apparent to those skilled in the art.

BRIEF SUMMARY OF THE INVENTION

This invention utilizes a conventional meat skinning machine having a frame, an elongated skinning blade, a rotatable gripping roll closely positioned adjacent the blade, an electrical motor operatively connected to the gripping roll and to a source of electrical power, and a danger zone defined by the area approximate to the gripping roll closely adjacent the blade. The motor of this invention is a braking motor which has a normally inoperative braking means adapted to stop the motor substantially instantaneously when becoming operative. A safety circuit is electrically connected to the braking motor, the blade and the gripping roll. The safety circuit is normally open and is adapted to be closed when the blade and gripping roll are electrically connected by any electroconducting means, such as an operator's glove made of electroconducting material, that simultaneously comes into electrical contact with the blade and the gripping roll. The closing of the safety circuit causes the braking means to be actuated substantially instantaneously to stop the braking motor and to stop substantially instantaneously any further rotation of the gripping roll.

An alternate form of the invention also provides closely spaced terminals in a danger area of the machine which will cause power to be immediately withdrawn from the machine whenever one of the operators electroconducting gloves comes into contact therewith.

A further alternate form of this invention provides spaced pairs of power switch terminals on this machine that can be closed only by simultaneous but separate contact between the terminals of each pair of terminals with the respective electroconducting gloves.

The method of the invention includes providing pairs of spaced power switch terminals on the machine that can be closed only by simultaneous but separate contact between the terminals of each pair of terminals with the respective electroconducting gloves.

A BRIEF DESCRIPTION OF THE DRAWINGS

FIG. 1 is a perspective view of the skinning machine of this invention;

FIG. 2 is an enlarged scale sectional view taken through the danger zone and showing the interrelationship of the skinning blade, the gripping roll and the operator's hand in an emergency situation;

FIG. 3 is an enlarged scale sectional view similar to that of FIG. 2 but shows how a portion of the operator's glove is broken away as the operator withdraws his hand when the tip of the fingers of the glove come in contact with the teeth of the gripping roll and the cutting edge of the blade;

FIG. 4 is a sectional view taken on line 4—4 of FIG. 2;

FIG. 5 is a schematic wiring diagram of this invention;

FIG. 6 is an enlarged scale sectional view taken through the cutting blade of this invention;

FIG. 7 is a perspective view of an alternate form of the skinning machine of this invention;

FIG. 8 is an enlarged scale sectional view taken on line 8-8 of FIG. 7;

FIG. 9 is a partial plan view as seen from lines 9—9 of FIG. 8;

FIG. 10 is a schematic wiring diagram of the alternate form of the master control switch of the invention; and FIG. 11 is a schematic wiring diagram of the essential circuitry of components of FIG. 8.

DESCRIPTION OF THE PREFERRED EMBODIMENT

The numeral 10 designates a meat skinning machine having a frame 12, an upper table 14, an elongated cutting blade 16, and a rotatably mounted gripping roll 18 having a plurality of sharp teeth 20 on its outer surface.

The numeral 21 (FIGS. 2 and 3) designates a danger zone defined by the adjacent relationship of the cutting blade and the gripping roll.

A conventional drive belt 22 (FIG. 5) connects brake motor 24 with gripper roll 18 so that the motor can provide rotational motion to the gripping roll. Brake motor 24 has a solenoid control 26 which, as described hereafter, is capable of imposing substantially instantaneous braking action to the output shaft of the motor whenever the motor is deprived of electrical power.

As best shown in FIG. 6, blade 16 has a bottom surface 16A, a top surface 16B, a rear edge 16C, and a tapered forward portion 16D. The bottom surface, top surface, and rear edge are covered with an electrical insulating material 28 comprised of lacquer, ceramic, teflon, or the like.

With reference to FIGS. 2 and 3, the skinning machine comprises a conventional shoe 30 having an inner arcuate surface 32 which is complimentary in shape to the outer surface of gripping roll 18. A conventional blade clamping plate 34 is mounted over blade 16 which is secured between plate 34 and shoe and 30. An electrical lead 36 is secured to blade 16 by a rivot 38 or the like (FIG. 6). The tapered forward portion 16D of blade 16 terminates in cutting edge 40.

With reference to FIG. 2, meat 42 with skin 44 thereon is shown to be conventionally passed over the gripping roll 18 into contact with the cutting edge 40 of blade 16 to sever the skin 44 from the meat. The skin 44 passes downwardly between the gripping roll and the arcuate inner surface 32 of shoe 30. The term fish products.

With reference to FIG. 5, the numeral 46 designates an electrical power source. Hot lead 48 extends from the power source and is connected to normally closed relay 50 which has normally dormant solenoid 52 secured thereto. Lead 54 connects relay 50 with motor 24. Master control switch 56 is imposed within lead 54. Lead 58 interconnects lead 54 and solenoid 26 on braking motor 24. Ground lead 60 extends from solenoid 26 to a suitable ground connection. Return lead 62 connects motor 24 with the power source 46. Thus, in normal operation, the operator closes switch 56 which causes current to flow through lead 48, relay 50, lead 54, motor 24 and return lead 62. Current also flows from lead 54 through solenoid 26 to ground connection 60. Solenoid 26 holds the braking mechanism of motor 24 in an inoperative condition so that the motor 24 is free to rotate and is free to operate to rotate gripping roll 18 through belt 22 in conventional fashion.

A safety circuit 64 is comprised of lead 66 which extends from lead 48 to a rotatable electrical connection with gripping roll 66. A safety circuit also includes lead 36 extending from blade 16 for connection to solenoid 52 on relay 50. Ground lead 68 connects solenoid 52 to a suitable ground connection.

With reference to FIGS. 2 and 3, the numeral 70 designates the hand of the operator upon which a glove body 72 is imposed. Glove body 74 has conventional finger portions 74. The numeral 74A in FIG. 3 denotes a detached finger portion of the glove body 72. The operator's fingers are denoted by the numeral 76. The brake motor 24 is of conventional construction and is available from Baldor Electric Co., Model LC0044.

Glove body 72 is comprised of a material having low tensile strength such as foam rubber o the like. Glove body should be impregnated with conductive carbon or the like so that it is capable of conducting electrical current.

In operation, the operator closes master switch 56, as described above, to cause motor 24 to rotate gripping roll 18. With reference to FIG. 2, if the operator's hand or fingers simultaneously contact the gripping roll and the non-insulated cutting edge of blade 16, the safety circuit 64 is closed because electrical current will flow from lead 48 through lead 66, through gripping roll 18, through skinning blade 16, and thence through lead 36 to solenoid 52. Solenoid 52 will then be electrically actuated as the current passes to ground 68. Upon becoming electrically actuated, solenoid 52 will cause the relay 50 to open, whereupon electrical current will no longer flow from the source of electrical power 46 through lead 48, and thence through lead 54 to motor 24. When lead 54 thereupon becomes deenergized, solenoid 26, which derives its power from lead 54 and lead 58, will also become de-energized, and the braking mechanism in motor 24 will then become operative through spring action or the like. The output shaft of motor 24 will instantaneously stop, whereupon rotational power through belt 22 to gripping roll 18 will also be instantaneously stopped. Thus, the fingers or hand of the operator will not be drawn into the cutting blade by the gripping roll 18.

Whenever an operator's hand moves into the danger zone 21 as shown in FIG. 2, the operator instinctively seeks to withdraw his or her hand. With a heavy glove, a gripping roll may entangle such a glove and continue to pull the hand of the operator into the blade in spite of the operator's efforts to withdraw the hand. However, with the fragile fabric of the glove of this invention, the entangled portion 74A of the glove will easily tear away from the remainder of the glove (FIG. 3) to permit the operator to easily withdraw the hand from the danger zone.

It is therefore seen that the method and means of this invention will function automatically and will serve to instantaneously stop the skinning machine, and the gripping roll thereof, whenever the electroconducting glove closes the safety circuit by simultaneously contacting the gripping roll and the exposed cutting edge of the blade 16.

It should be noted that while the preferred embodiment of this invention contemplates that the gripping roll and the cutting edge of the blade will function as the electroconducting elements which are interconnected by the electroconducting glove, other such components capable of conducting electricity, such as a blade clamping plate 34 capable of conducting electricity, could be employed without departing from this invention.

DESCRIPTION OF THE ALTERNATE FORM OF THE INVENTION

With reference to FIGS. 7-11, the numeral 10A designates a meat skinning machine which has the same components as machine 10 except for those additional components described below and set forth in FIGS. 7-11. The wiring diagrams of FIGS. 10 and 11 are adapted to be applied to the circuitry of FIG. 5, as discussed below.

A danger zone 78 adjacent blade 16 and roll 18 is comprised of board 80 of dielectric material wherein rows of closely spaced electrodes 82 and 84 are imbedded. The upper and lower ends of the electrodes are exposed on the upper and lower surfaces of board 80.

The spacing of electrodes 82 and 84 is close enough that virtually any finger or hand contact with board 80 by electroconducting glove 72 will cause the glove to make electrical contact therebetween. The electrodes 82 are connected to lead 86, and the electrodes 84 are connection to lead 88. Lead 86 is connected to lead 48, and lead 88 is connected to normally closed relay 90 which in turn is connected to ground lead 92. Relay 90 is adapted, upon being energized, to open switch 94 imposed in lead 48. Thus, if the electroconductive glove 72 touches board 80 to electrically connect any two terminals 82 and 84, power will be supplied through lead 48, lead 86, terminals 82 and 84 on board 80, lead 88, relay 90 and ground lead 92. Relay 90 will thus open switch 94 to immediately deprive motor 24 of power through the remaining circuitry of FIG. 5.

With reference to FIGS. 7 and 10, spaced pairs of terminals 96 and 98 are comprised respectively of terminal points 96A and 96B; and 98A and 98B. Each pair of terminals are independently connected to normally open holding relays 100 by leads 102 and 103. Relay coil 104 is connected to ground lead 106. Relay switch 108 is imposed in lead 102 which has its downstream end connected to lead 54 (FIG. 10). The pairs of terminals 96 and 98 are far enough apart that the operator cannot interconnect the terminal points of both pairs of terminals with one gloved hand.

Thus, to start the machine 10A, the operator closes master control switch 56, and thence places one gloved hand on terminal points 96A and 96B, with the other gloved hand on terminal points 98A and 98B. The circuit through lead 54 will thereupon be completed by closed switch 56 and the electroconductive gloves 72 connecting the terminal points of terminal pairs 96 and 98. At the same instant, normally open holding relays 100 will be closed as power flows downstream through the left-hand glove 72A, through lead 103 and relay coil 104 to ground 106. With relay 104 energized, switch 108 will close to let power by-pass terminal point 96 through lead 102 and switch 108 even when glove 72A is removed from terminal points 96A and 96B. Even with glove 72A so removed, power will continue to be supplied to relay coil 104 from lead 102, lead 54A, and lead 103. Thus switch 108 will then remain closed even though glove 72A is removed from terminal 72A.

As soon as glove 72A closes terminal 96, power is supplied to terminal 98 which can be closed by electroconductive glove 72B. The relay 100 connected to terminal 98 is then actuated in the same manner as the relay 100 connected to terminal 96, whereupon power will be completed through lead 54 to motor 24 even after the operator's gloved hands are removed from the terminals 96 and 98.

The advantage of using terminals 96 and 98 is that the operator is required to wear gloves on both hands to start the machine 10A. Once the gloves are on the hands of the operator, the safety circuitry of both FIGS. 5 and 11 can come into play if the operator touches with either glove the board 80 in danger zone 78, (FIG. 7), or touches the roll 18 and blade 16. (FIG. 2) The terminals 96 and 98 require that two gloves be used to start the machine, and thus serve as both a reminder and an inducement for the operator to wear the gloves so that they will be in place to serve their other safety functions in regard to board 80, and the safety circuitry of FIG. 5.

It is therefore seen that this invention will accomplish at least all of its stated objectives.

I claim:

1. A meat skinning machine having a frame, an elongated skinning blade, a rotatable gripping roll closely positioned adjacent said blade, and an electrical motor operatively connected to said gripping roll and to a source of electrical power and a danger zone defined by the area proximate to said gripping roll closely adjacent said blade, the improvement comprising,
   an electroconductive glove,
   a master switch means electrically connected to said electric motor and said source of electrical power, and being positioned therebetween,
   said master switch means comprising at least two spaced apart electrical terminals adapted to be electrically connected by contact with said electroconductive glove on the hand of the machine operator, with said glove being free from hard-wired connection with said skinning machine.

2. The machine of claim 1 wherein said master switch means comprises at least two spaced apart pairs of spaced apart electrical terminals adapted to be simultaneously electrically connected by both electroconductive gloves on the two hands of the machine operator.

3. The machine of claim 2 wherein said paris of electrical terminals are far enough apart that they cannot be simultaneously engaged by one gloved hand of the machine operator.

4. The machine of claim 1 wherein said motor is a braking motor having normally inoperative braking means adapted to stop said motor substantially instantaneously when becoming operative.

5. The machine of claim 1 wherein an electroconducting terminal board means is positioned adjacent said blade, spaced terminal means on said board means connected to a normally open safety circuit which is connected to said motor, whereby said safety circuit will be activated upon contact by an electroconducting glove worn by a machine operator with said terminal means to interrupt electrical power to said motor.

6. The machine of claim 5 wherein said terminal means is a plurality of closely spaced terminal elements wherein even finger contact with said board by a finger of said electroconducting glove on the operator's hand will electrically connect said terminal elements through said glove.

7. The machine of claim 1 wherein a holding relay means is connected to said spaced apart electrical terminals so that electrical power will by-pass said spaced terminals after said electroconductive glove is removed from contact with said terminals.

8. A meat skinning machine having a frame, an elongated skinning blade, a rotatable gripping roll closely positioned adjacent said blade, and an electrical motor operatively connected to said gripping roll and to a source of electrical power and a danger zone defined by the area proximate to said griping roll closely adjacent said blade, the improvement comprising,
   an electroconducting glove,
   an electroconducting terminal board means positioned adjacent said blade,
   spaced terminal means on said board means connected to a normally open safety circuit which is connected to said motor, whereby said safety circuit will be activated upon contact by said electroconducting glove worn by a machine operator with said terminal means to interrupt electrical power to said motor, with said glove being free from hard-wired connection to said skinning machine.

9. The machine of claim 8 wherein said terminal means is a plurality of closely spaced terminal elements wherein even finger contact with said board by a finger of said electroconducting glove on the operator's hand will electrically connect said terminal elements through said glove.

10. The method of inducing a machine operator to wear electroconductive safety gloves during the operation of powered machinery having a safety circuit, including a motor connected to a source of electrical power, a master control switch in said circuit, and at least two spaced apart terminal means on said machine; comprising, closing said master control switch, taking an electroconducting glove free from hard-wired connection with said safety circuit, and connecting said terminal means by an electroconducting glove on the hand of said machine operator.

11. The method of claim 10 wherein said machine has two pairs of spaced apart terminal means, each having two spaced terminal elements and connecting said terminal elements of each terminal means by simultaneously connecting several elements with an electroconductive glove on each hand of the machine operator.

12. A meat skinning machine having a frame, an elongated skinning blade, a rotatable gripping roll closely positioned adjacent said blade, and an electrical motor operatively connected to said gripping roll and to a source of electrical power and a danger zone defined by the area proximate to said gripping roll closely adjacent said blade, the improvement comprising, at electroconductive glove, a master switch means electrically connected to said electric motor and said source of electrical power, and being positioned therebetween, said master switch means comprising at least two spaced apart electrical terminals adapted to be electrically connected by one said electroconductive glove on a hand of the machine operator, an electroconducting terminal board means positioned adjacent said blade, spaced terminal means on said board means connected to a normally open safety circuit which is connected to said motor, whereby said safety circuit will be activated upon contact by one said electroconductive glove worn by a machine operator with said terminal means to interrupt electrical power to said motor, said terminal means comprising a plurality of closely spaced terminal elements wherein finger contact with said board by a finger of said electroconductive glove on the operator's hand will electrically connect said terminal elements through one said glove.

13. A meat skinning machine having a frame, an elongated skinning blade, a rotatable gripping roll closely positioned adjacent said blade, and an electrical motor operatively connected to said gripping roll and to a source of electrical power and a danger zone defined by the area proximate to said gripping roll closely adjacent said blade, the improvement comprising, an electroconducting terminal board means positioned adjacent said blade, spaced terminal means on said board means connected to a normally open safety circuit which is connected to said motor, whereby said safety circuit will be activated upon contact by an electroconducting glove worn by a machine operator with said terminal means to interrupt electrical power to said motor, said terminal means comprising a plurality of closely spaced terminal elements wherein finger contact with said board by a finger of said electroconducting glove on the operator's hand will electrically connect said terminal elements through said glove.

* * * * *

UNITED STATES PATENT AND TRADEMARK OFFICE
CERTIFICATE OF CORRECTION

PATENT NO. : 4,996,742
DATED : March 5, 1991
INVENTOR(S) : Ray T. Townsend

It is certified that error appears in the above-identified patent and that said Letters Patent is hereby corrected as shown below:

On the title page, item (63) should read.

-- Related U.S. Application Data

[63] Continuation-In-Part of Ser. No. 426,668, filed October 26, 1989, Pat. No. 5,083,973.--.

Signed and Sealed this

Ninth Day of November, 1993

Attest:

BRUCE LEHMAN

Attesting Officer

Commissioner of Patents and Trademarks